(12) United States Patent
Wu et al.

(10) Patent No.: US 9,697,444 B2
(45) Date of Patent: Jul. 4, 2017

(54) CONVOLUTIONAL-NEURAL-NETWORK-BASED CLASSIFIER AND CLASSIFYING METHOD AND TRAINING METHODS FOR THE SAME

(71) Applicant: FUJITSU LIMITED, Kawasaki-shi, Kanagawa (JP)

(72) Inventors: Chunpeng Wu, Beijing (CN); Wei Fan, Beijing (CN); Yuan He, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 311 days.

(21) Appl. No.: 14/448,049

(22) Filed: Jul. 31, 2014

(65) Prior Publication Data
US 2015/0036920 A1    Feb. 5, 2015

(30) Foreign Application Priority Data

Jul. 31, 2013    (CN) .......................... 2013 1 0329465

(51) Int. Cl.
*G06K 9/46*    (2006.01)
*G06K 9/62*    (2006.01)
*G06N 3/04*    (2006.01)

(52) U.S. Cl.
CPC ......... *G06K 9/6272* (2013.01); *G06K 9/4628* (2013.01); *G06K 9/6267* (2013.01); *G06N 3/0454* (2013.01); *G06N 3/0481* (2013.01)

(58) Field of Classification Search
None
See application file for complete search history.

(56) References Cited

U.S. PATENT DOCUMENTS

2007/0047802 A1    3/2007  Puri

FOREIGN PATENT DOCUMENTS

| CN | 101253493 | 8/2008 |
| EP | 0479383 | 1/1998 |

OTHER PUBLICATIONS

On Optimization Methods for Deep Learning. Quoc V. Le, Jiquan Ngiam, Adam Coates, Abhik Lahiri, Bobby Prochnow, Andrew Y. Ng. 2011.*
Tiled convolutional neural networks. Quoc V. Le, Jiquan Ngiam, Zhenghao Chen, Daniel Chia, Pang Wei Koh, Andrew Y. Ng. 2010.*
Face Image Analysis with Convolutional Neural Networks. Stefan Duffner. 2008.*

(Continued)

*Primary Examiner* — Delomia L Gilliard
(74) *Attorney, Agent, or Firm* — Staas & Halsey LLP (57) ABSTRACT

The present invention relates to a convolutional-neural-network-based classifier, a classifying method by using a convolutional-neural-network-based classifier and a method for training the convolutional-neural-network-based classifier. The convolutional-neural-network-based classifier comprises: a plurality of feature map layers, at least one feature map in at least one of the plurality of feature map layers being divided into a plurality of regions; and a plurality of convolutional templates corresponding to the plurality of regions respectively, each of the convolutional templates being used for obtaining a response value of a neuron in the corresponding region.

8 Claims, 8 Drawing Sheets

(56) References Cited

OTHER PUBLICATIONS

Quoc V Le et al: "On Optimization Methods for Deep Learning (w/ supplement)", The 28th International Conference on Machine Learning (ICML'11), Jun. 1, 2011, pp. 265-272.
Quoc V Le et al: "Tiled Convolutional Neural Networks", Advances in Neural Information Processing Systems 23, Dec. 31, 2818 (Dec. 31, 2818), pp. 1279-1287.
Hesam Amir Salavati: "Notes on the paper "Tiled Convolutional Neural Networks"", Aug. 24, 2012.
Stefan Duffner: "Face Image Analysis With Convolutional Neural Networks", Mar. 28, 2008.
Aiviin Karbasi et al: "Iterative Learning and Denoising in Convolutional Neural Associative Memories", International Conference on Machine Learning (ICML) Jun. 21, 2013.
Andres Calderon et al: "Handwritten Digit Recognition using Convolutional Neural Networks and Gabor filters", International Congress on Computational Intelligence, Dec. 31, 2003.
European Search Report mailed Apr. 17, 2015 in corresponding European Application No. 14174111.6-1901.
Chinese Office Action dated Feb. 20, 2017 in Chinese Patent Application No. 201310329465.7.
Shan-shan Xu et al., "Wood defects recognition based on the convolutional neural network", Journal of Shandong University, vol. 43 No. 2, Apr. 2013, pp. 23-28.

\* cited by examiner (prior art)
Fig.1

T1 = Func(w1*S1 + w2*S2 + w3*S4 + w4*S5 + w5*S10 + w6*S11 + w7*S13 + w8*S14) + b (prior art)
Fig.4

T2 = Func(w1*S2 + w2*S3 + w3*S5 + w4*S6 + w5*S11 + w6*S12 + w7*S14 + w8*S15) + b (prior art)
Fig.5

T3 = Func(w1*S4 + w2*S5 + w3*S7 + w4*S8 + w5*S13 + w6*S14 + w7*S16 + w8*S17) + b (prior art)
Fig.6

T4 = Func(w9*S5 + w10*S6 + w11*S8 + w12*S9 + w13*S14 + w14*S15 + w15*S17 + w16*S18) + b2

CONVOLUTIONAL-NEURAL-NETWORK-BASED CLASSIFIER AND CLASSIFYING METHOD AND TRAINING METHODS FOR THE SAME

CROSS-REFERENCE TO RELATED APPLICATION

This application is based upon and claims the foreign priority benefit of Chinese Patent Application No. 201310329465.7, filed Jul. 31, 2013, the entire contents of which are incorporated herein by reference.

TECHNICAL FIELD

The present invention relates to the field of image recognition, and particularly to a convolutional-neural-network-based classifier, a classifying method by using a convolutional-neural-network-based classifier and a method for training the convolutional-neural-network-based classifier.

BACKGROUND ART

Figure 1:
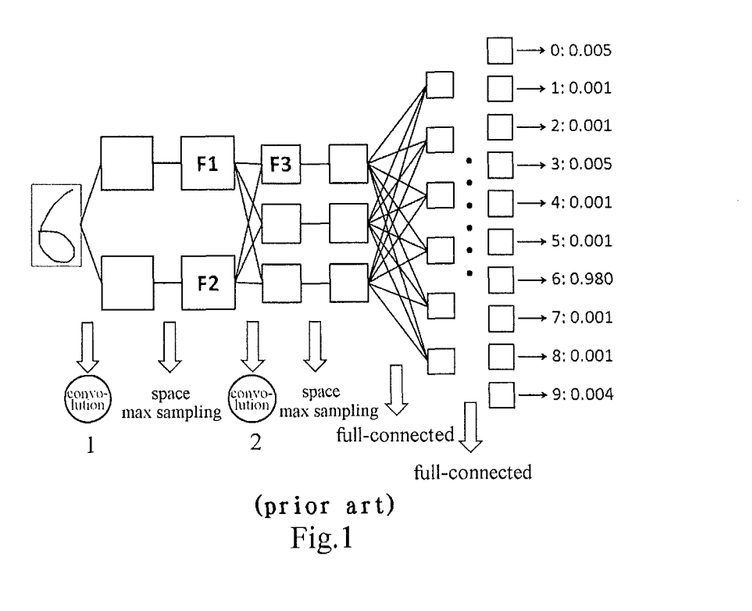
FIG. 1 is a schematic view illustrating a conventional convolutional-neural-network-based classifier.

A convolutional neural network (referred to as CNN for short) classifier is generally used for image recognition. FIG. 1 illustrates a conventional convolutional-neural-network-based classifier. FIGS. 4-7 illustrate a process of calculating a response value of a neuron using a conventional convolutional-neural-network-based classifier. In the process of performing recognition using the conventional convolutional-neural-network-based classifier, taking hand-written digits for example, an image is inputted, and after a plurality of times of repeated operations of convolution, space max sampling and full connection are performed, the convolutional-neural-network-based classifier outputs confidence on each kind of digit, and an output with the highest confidence is a recognition result. Each box in FIG. 1 and FIGS. 4 to 7 is a feature map, for example F1, F2 and F3, and an input image may also be regarded as a feature map.

In the above method, the convolution operation performs a function of extracting a feature from a feature map in a previous layer. However, the convolution operation of the conventional convolutional-neural-network-based classifier limits the number of extractable features to a great extent, resulting in an insufficiently flexible structure of the convolutional-neural-network-based classifier.

SUMMARY OF THE INVENTION

Hereinafter, brief descriptions of the present invention will be made, so as to provide a basic understanding to some aspects of the present invention. It should be understood that the brief descriptions are not exhaustive brief descriptions of the present invention. They are neither intended to determine the key or essential parts of the present invention nor intended to limit the scope of the present invention, but only aim to provide some concepts in a simplified form, for use as a preamble of more detailed descriptions addressed later.

A main object of the present invention is to provide a convolutional-neural-network-based classifier, a classifying method by using a convolutional-neural-network-based classifier and a method for training the convolutional-neural-network-based classifier.

According to one embodiment of the present invention, there is provided a convolutional-neural-network-based classifier, comprising: a plurality of feature map layers, at least one feature map in at least one of the plurality of the feature map layers being divided into a plurality of regions; and a plurality of convolutional templates corresponding to the plurality of regions respectively, each of the convolutional templates being used for obtaining a response value of a neuron in the corresponding region.

According to another embodiment of the present invention, there is provided a classifying method by using a convolutional-neural-network-based classifier which comprises a plurality of feature map layers, comprising: dividing at least one feature map in at least one of the plurality of the feature map layers into a plurality of regions; performing forward propagation by inputting the an object to be classified into the convolutional-neural-network-based classifier to obtain an output result, during the forward propagation, each of the convolutional templates, which correspond to the plurality of regions respectively, is used for obtaining a response value of a neuron in the corresponding region; and classifying the object to be classified according to the output result.

According to yet another embodiment of the present invention, there is provided a method for training the convolutional-neural-network-based classifier, which comprises a plurality of feature map layers, comprising: dividing at least one feature map in the at least one of the plurality of the feature map layers into a plurality of regions; performing forward propagation by inputting a training sample with a known flag into the convolutional-neural-network-based classifier to obtain an output result, during the forward propagation, each of the convolutional templates, which correspond to the plurality of regions respectively, is used for obtaining a response value of a neuron in the corresponding region; performing back propagation according to the difference between the output result and the known flag to correct parameters of the convolutional-neural-network-based classifier comprising the weights in the convolutional template; and repeating the above steps until a predetermined condition is met.

In addition, the embodiments of the present invention further provide a computer program for carrying out the above method.

Besides, the embodiments of the present invention further provide a computer product program in the form of at least a computer-readable medium.

These and other advantages of the present invention will become more apparent from the following detailed descriptions of the best embodiments of the present invention combined with the accompanying drawings.

BRIEF DESCRIPTION OF THE DRAWINGS

Hereinafter, embodiments of the present invention will be described combined with the attached drawings in order to facilitate the understanding to the above and other advantages and features of the present invention. The components in the attached drawings aim only to illustrate the principle of the present invention. In the attached Drawings, identical or similar technical features or components will be denoted by identical or similar reference signs.

DETAILED DESCRIPTION OF THE EMBODIMENTS

Hereinafter, embodiments of the present invention will be described with reference to the attached drawings. Elements and features described in one figure or one embodiment of the present invention may be combined with elements and features illustrated in one or more other figures or embodiments. It should be noted that, for the purpose of clarity, representations and descriptions of components and processing irrelevant to the present application which are known to those ordinarily skilled in the art are omitted in the attached drawings and descriptions thereof.

Figure 2:
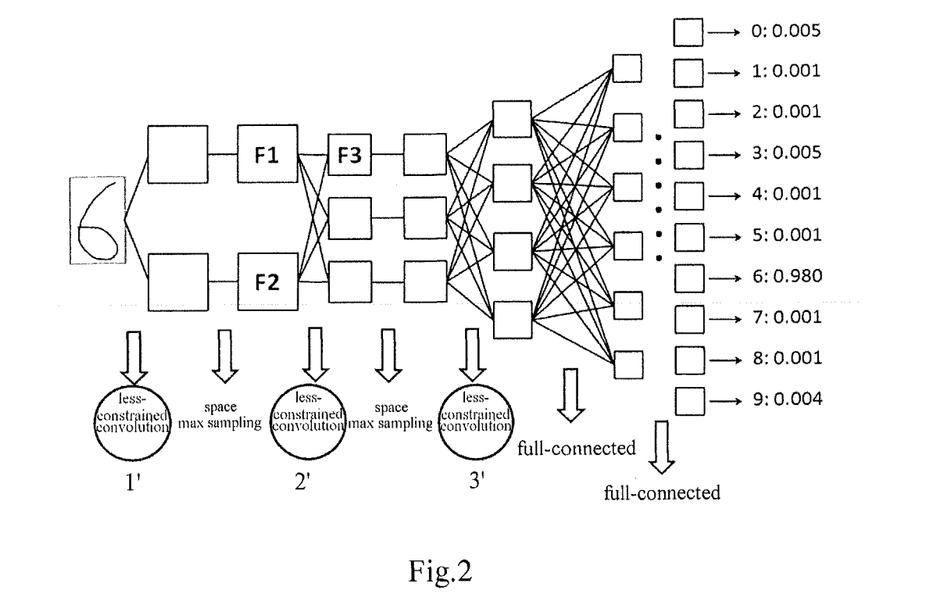
FIG. 2 is a schematic view illustrating a convolutional-neural-network-based classifier according to an embodiment of the present invention.
Figure 3:
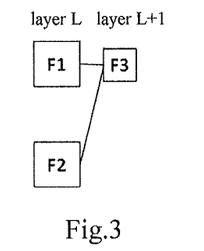
FIG. 3 is a schematic view illustrating parts selected from FIG. 1 or 2.

FIG. 2 is a schematic view illustrating a convolutional-neural-network-based classifier according to an embodiment of the present invention. FIG. 3 is a schematic view illustrating parts selected from FIG. 1 or 2. FIGS. 8 to 11 are schematic views illustrating a process of calculating a response value of a neuron using the convolutional-neural-network-based classifier according to the embodiment of the present invention.

As shown in FIG. 2, FIG. 3 and FIGS. 8-11, the convolutional-neural-network-based classifier according to the embodiment of the present invention comprises a plurality of feature map layers, at least one feature map in at least one of the feature map layers being divided into a plurality of regions. The convolutional-neural-network-based classifier according to the embodiment of the present invention further comprises a plurality of convolutional templates corresponding to the plurality of regions respectively, each of the convolutional templates being used for obtaining a response value of a neuron in the corresponding region.

Specifically, comparing the convolutional-neural-network-based classifier as shown in FIG. 2 with the conventional convolutional-neural-network-based classifier as shown in FIG. 1, less-constrained convolution operations 1' an 2' in FIG. 2 substitute for convolution operations 1 and 2 in FIG. 1, respectively. In addition, as compared with FIG. 1, in FIG. 2, a less-constrained convolution operation 3' is added prior to the full-connection operation. The less-constrained convolution operation in FIG. 2 is the aforementioned operation of performing convolution using a plurality of convolutional templates.

In this text, the term "less-constrained convolution operation" refers to using different convolutional templates in calculating response values of neurons in the same feature map, wherein a layer where the feature map lies is called a "less-constrained convolution layer".

In other embodiments, a network structure of the convolutional-neural-network-based classifier may be properly adjusted. For example, the number of paired operations of "less-constrained convolution-space max sampling" is increased or decreased, the number of the full-connection operation is increased or decreased, the number of the less-constrained convolution operation appearing separately is increased or decreased, the space max sampling operation is substituted with a space sub sampling operation, etc.

To further describe the details of the less-constrained convolution operation, only parts of related features maps F1, F2 and F3 in FIG. 2 are selected to make exemplary descriptions. For the parts selected from FIG. 2, please refer to FIG. 3. As shown in FIG. 3, two adjacent layers, Layer L and layer L+1, are selected. Hereinafter, the conventional convolutional-neural-network-based classifier and the convolutional-neural-network-based classifier according to the present invention will be compared with each other on the basis of FIG. 3, so as to find differences therebetween.

FIGS. 4 to 7 illustrate a process of calculating response values (the response values are also correspondingly marked as T1, T2, T3 and T4) of neurons T1, T2, T3, and T4 in the feature map F3 in the layer L+1 in FIG. 3 using the conventional convolutional-neural-network-based classifier. FIGS. 8 to 11 illustrate a process of calculating response values (the response values are also correspondingly marked as T1, T2, T3 and T4) of neurons T1, T2, T3, and T4 in the feature map F3 in the layer L+1 in FIG. 3 using the convolutional-neural-network-based classifier according to the embodiments of the present invention. Hereinafter, the convolutional-neural-network-based classifier according to the present invention will be described through comparison.

Firstly, in order to facilitate understanding, FIGS. 4 to 11 are described as follows:

(1) Each circle in FIGS. 4 to 11 represents a neuron.

(2) All w values in FIGS. 4 to 11 are values of the convolutional templates, and all the w values are learned through back propagation during the training of the neural network.

(3) The size of all the convolutional templates in FIGS. 4 to 11 is 2×2; however, it would be understood that the size of the convolutional templates may be of any value in actual use.

(4) The dashed line in the feature map F3 in the layer L+1 in FIGS. 8 to 11 indicates that all the neurons in the feature map F3 are divided into two classes, wherein each class of the neurons uses identical templates, that is, T1 and T2 use one group of convolutional templates, and T3 and T4 use another group of convolutional templates. As would be readily understood, however, the number of classes to which neurons in one feature map may be arbitrarily specified, and the manner of the dividing thereof may be determined according to specific tasks. For example, for handwritten characters recognition, dividing may be performed according to the stroke pixel density distribution. Various dividing schemes will be described below.

(5) Specific formulae for calculating the response values of the neurons T1, T2, T3 and T4 are provided at the lower part in FIGS. 4 to 11. The process of calculating the response values of the neurons in the layer L+1 is obtained by applying a slide window at the layer L, and multiplying the response values of the neurons in the slide window of the layer L by the corresponding values of the convolutional templates. In the formulae, b, b1 and b2 represent bias terms (learning is performed through back propagation during the training of the neutral network). In the formulae, function Func( ) represents a nonlinear transformation function, which uses a hyperbolic tangent function in a conventional method, and according to the embodiment of the present invention, a non-linear truncated function may be used to achieve the object of increasing a convergence speed, which will be described later.

Firstly, the process of calculating response values (the response values are also correspondingly marked as T1, T2, T3 and T4) of neurons T1, T2, T3, and T4 in the feature map F3 in the layer L+1 in FIG. 3 using the conventional convolutional-neural-network-based classifier is described with reference to FIGS. 4-7.

Figure 4:
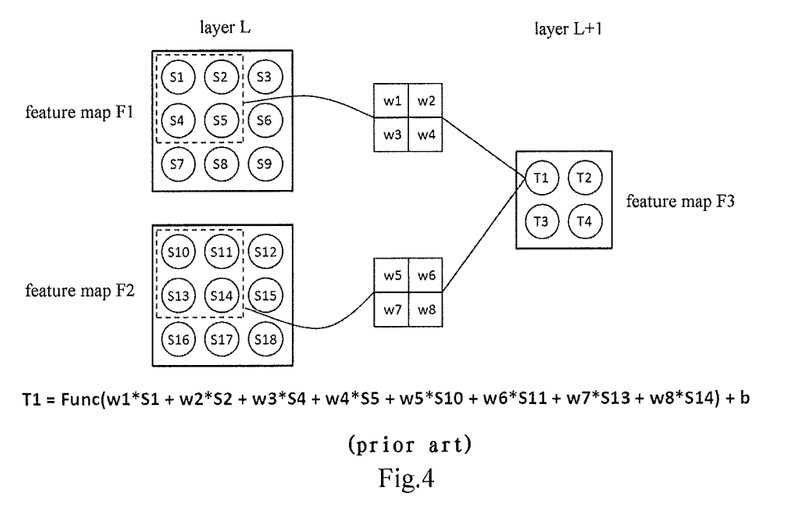
FIGS. 4 to 7 are schematic views illustrating a process of calculating a response value of a neuron using the conventional convolutional-neural-network-based classifier.

FIG. 4 illustrates the process of calculating the response value of the neuron T1 in the feature map F3 in the layer L+1 in FIG. 3 using the conventional convolutional-neural-network-based classifier. As shown in FIG. 4, in the conventional convolutional-neural-network-based classifier, the response value of the neuron T1 in the feature map F3 is obtained by using response values (the response values are also correspondingly marked as S1, S2, S4 and S5) of neurons S1, S2, S4 and S5 (i.e. the four neurons at the left upper part of the feature map F1) in the feature map F1 and response values (the response values are also correspondingly marked as S10, S11, S13 and S14) of neurons S10, S11, S13 and S14 (i.e. the four neurons at the left upper part of the feature map F2) in the feature map F2 in the layer L, as well as a template comprising weights w1, w2, w3 and w4 and a template comprising w5, w6, w7 and w8. Therefore, the response value T1 is as follows:

$$T1=\text{Func}(w1*S1+w2*S2+w3*S4+w4*S5+w5*S10+w6*S11+w7*S13+w8*S14)+b \qquad (1)$$

Figure 5:
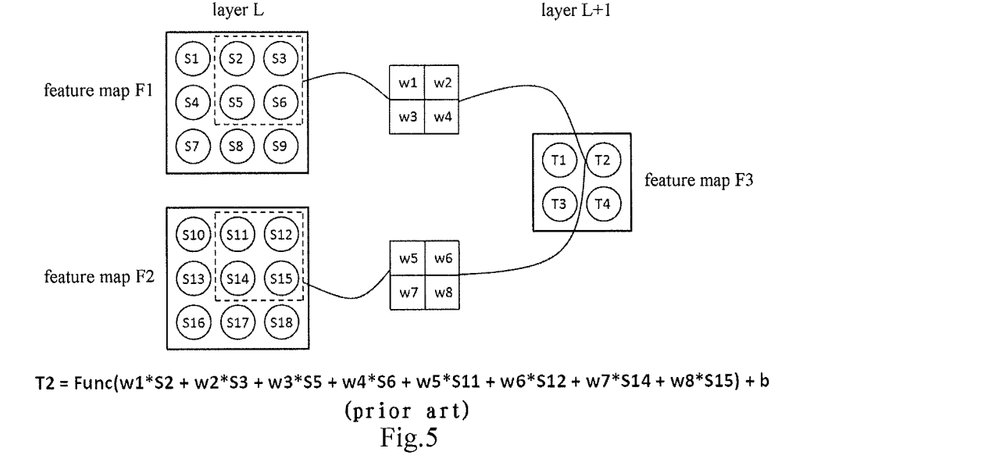

FIG. 5 illustrates the process of calculating the response value of the neuron T2 in the feature map F3 in the layer L+1 in FIG. 3 using the conventional convolutional-neural-network-based classifier. As shown in FIG. 5, in the conventional convolutional-neural-network-based classifier, the response value of the neuron T2 in the feature map F3 is obtained using response values (the response values are also correspondingly marked as S2, S3, S5 and S6) of neurons S2, S3, S5 and S6 (i.e. the four neurons at the right upper part of the feature map F1) in the feature map F1 and response values (the response values are also correspondingly marked as S11, S12, S14 and S15) of neurons S11, S12, S14 and S15 (i.e. the four neurons at the right upper part of the feature map F2) in the feature map F2 in the layer L, as well as a template comprising weights w1, w2, w3 and w4 and a template comprising w5, w6, w7 and w8. Therefore, the response value T2 is as follows:

$$T2=\text{Func}(w1*S2+w2*S3+w3*S5+w4*S6+w5*S11+w6*S12+w7*S14+w8*S15)+b \qquad (2)$$

Figure 6:
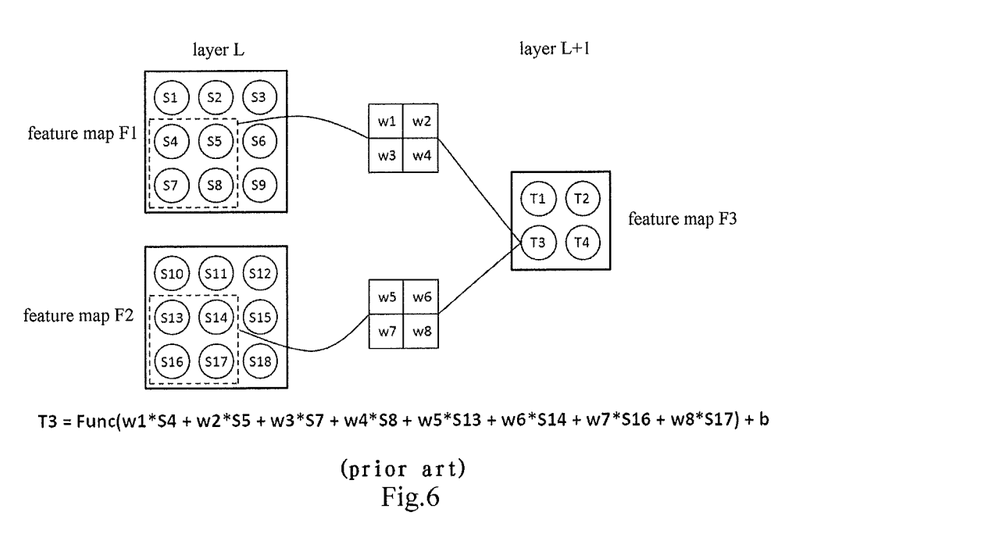

FIG. 6 illustrates the process of calculating the response value of the neuron T3 in the feature map F3 in the layer L+1 in FIG. 3 by using the conventional convolutional-neural-network-based classifier. As shown in FIG. 6, in the conventional convolutional-neural-network-based classifier, the response value of the neuron T3 in the feature map F3 is obtained by using response values (the response values are correspondingly marked as S4, S5, S7 and S8) of neurons S4, S5, S7 and S8 (i.e. the four neurons at the left lower part of the feature map F1) in the feature map F1 and response values (the response values are correspondingly marked as S13, S14, S16 and S17) of neurons S13, S14, S16 and S17 (i.e. the four neurons at the right upper part of the feature map F2) in the feature map F2 in the layer L, as well as a template comprising weights w1, w2, w3 and w4 and a template comprising w5, w6, w7 and w8. Therefore, the response value T3 is as follows:

$$T3=\text{Func}(w1*S4+w2*S5+w3*S7+w4*S8+w5*S13+w6*S14+w7*S16+w8*S17)+b \qquad (3)$$

Figure 7:
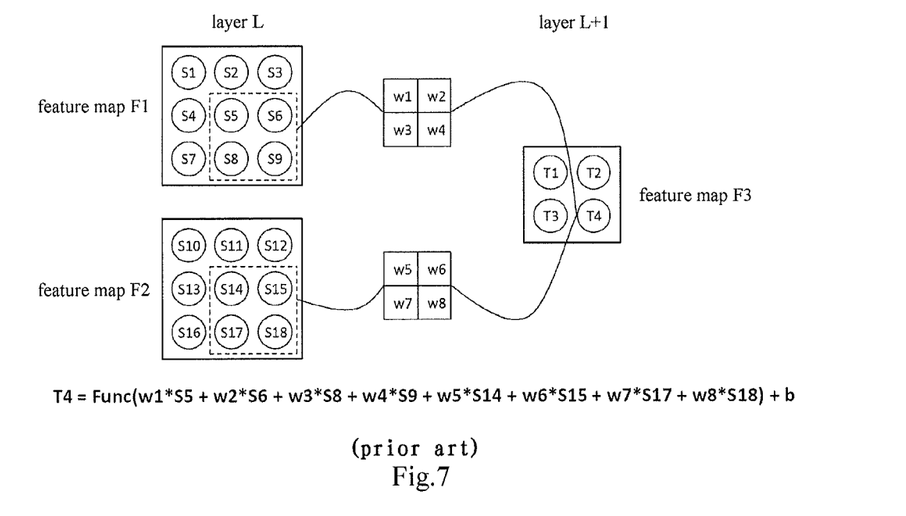

FIG. 7 illustrates the process of calculating the response value of the neuron T4 in the feature map F3 in the layer L+1 in FIG. 3 by using the conventional convolutional-neural-network-based classifier. As shown in FIG. 7, in the conventional convolutional-neural-network-based classifier, the response value of the neuron T4 in the feature map F3 is obtained by using response values (the response values are correspondingly marked as S5, S6, S8 and S9) of neurons S5, S6, S8 and S9 (i.e. the four neurons at the right lower part of the feature map F1) in the feature map F1 and response values (the response values are correspondingly marked as S14, S15, S17 and S18) of neurons S14, S15, S16 and S18 (i.e. the four neurons at the right upper part of the feature map F2) in the feature map F2 in the layer L, as well as a template comprising weights w1, w2, w3 and w4 and a template comprising w5, w6, w7 and w8. Therefore, the response value T4 is as follows:

$$T4=\text{Func}(w1*S5+w2*S6+w3*S8+w4*S9+w5*S14+w6*S15+w7*S17+w8*S18)+b \qquad (4)$$

As can be seen from FIGS. 4 to 7 (in particular the calculation formulae provided therein), for the conventional convolutional manner, in calculating a response value of any neuron in the feature map F3 in the layer L+1: the feature map F1 in the layer L uses the same convolutional templates (w1, w2, w3, w4) all the time, and the feature map F2 in the layer L uses the same convolutional templates (w5, w6, w7, w8) all the time.

Now, the process of calculating the response values of the neurons T1, T2, T3 and T4 in the feature map F3 in the layer L+1 in FIG. 3 by using the convolutional-neural-network-based classifier according to the present invention is described with reference to FIGS. 8 to 11.

As shown in FIGS. 8 to 11, the feature map F3 is divided into upper and lower regions, wherein the response values of the neurons T1 and T2 in the upper region are calculated using one group of templates, while the response values of the neurons T3 and T4 in the lower region are calculated using another group of templates.

Figure 8:
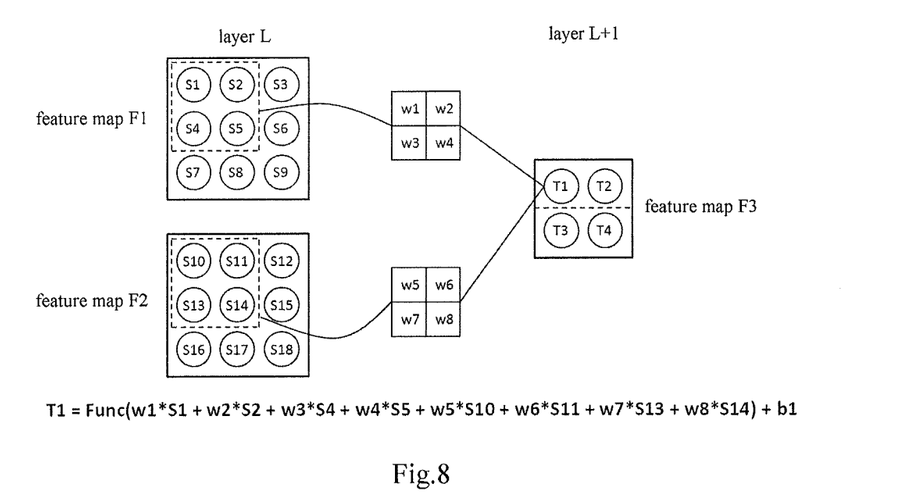
FIGS. 8 to 11 are schematic views illustrating a process of calculating a response value of a neuron using the convolutional-neural-network-based classifier according to the embodiment of the present invention.

FIG. 8 illustrates the process of calculating the response value of the neuron T1 in the feature map F3 in the layer L+1 in FIG. 3 by using the convolutional-neural-network-based classifier according to the present invention. As shown in FIG. 8, in the convolutional-neural-network-based classifier according to the embodiments of the present invention, the response value of the neuron T1 in the feature map F3 is obtained by using response values (the response values are correspondingly marked as S1, S2, S4 and S5) of neurons S1, S2, S4 and S5 (i.e. the four neurons at the left upper part of the feature map F1) in the feature map F1 and response values (the response values are correspondingly marked as S10, S11, S13 and S14) of neurons S10, S11, S13 and S14 (i.e. the four neurons at the left upper part of the feature map F2) in the feature map F2 in the layer L, as well as a template comprising weights w1, w2, w3 and w4 and a template comprising w5, w6, w7 and w8. Therefore, the response value T1 is as follows:

$$T1=\text{Func}(w1*S1+w2*S2+w3*S4+w4*S5+w8*S10+w6*S11+w7*S13+w8*S14)+b1 \qquad (5)$$

Figure 9:
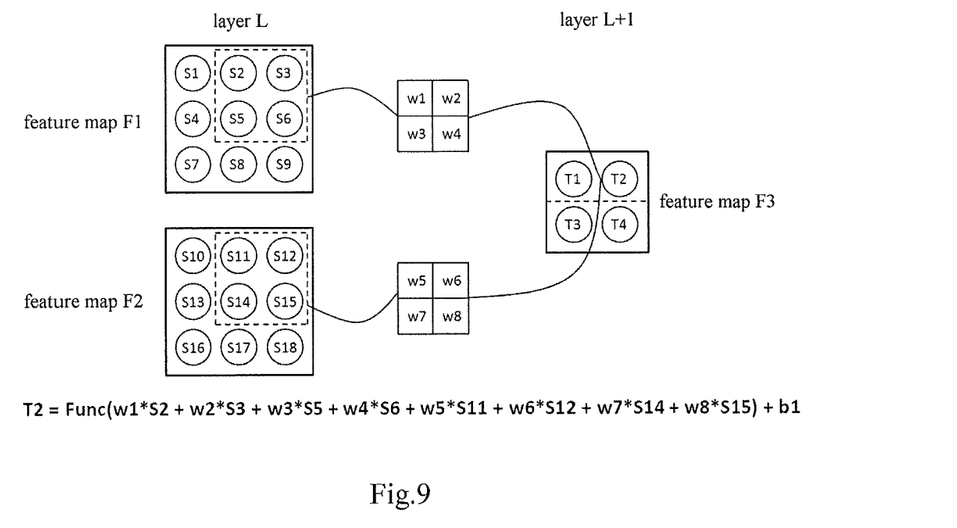

FIG. 9 illustrates the process of calculating the response value of the neuron T2 in the feature map F3 in the layer L+1 in FIG. 3 by using the convolutional-neural-network-based classifier according to the embodiments of the present invention. As shown in FIG. 9, in the convolutional-neural-network-based classifier according to the embodiments of the present invention, the response value of the neuron T2 in the feature map F3 is obtained by using response values (the response values are correspondingly marked as S2, S3, S5 and S6) of neurons S2, S3, S5 and S6 (i.e. the four neurons at the right upper part of the feature map F1) in the feature map F1 and response values (the response values are correspondingly marked as S11, S12, S14 and S15) of neurons S11, S12, S14 and S15 (i.e. the four neurons at the right upper part of the feature map F2) in the feature map F2 in the layer L, as well as a template comprising weights w1, w2, w3 and w4 and a template comprising w5, w6, w7 and w8. Therefore, the response value T2 is as follows:

$$T2=\text{Func}(w1*S2+w2*S3+w3*S5+w4*S6+w5*S11+w6*S12+w7*S14+w8*S15)+b1 \qquad (6)$$

It can be seen that the same set of templates is used in calculating the response values of the neurons T1 and T2 in the upper region of the feature map F3.

Figure 10:
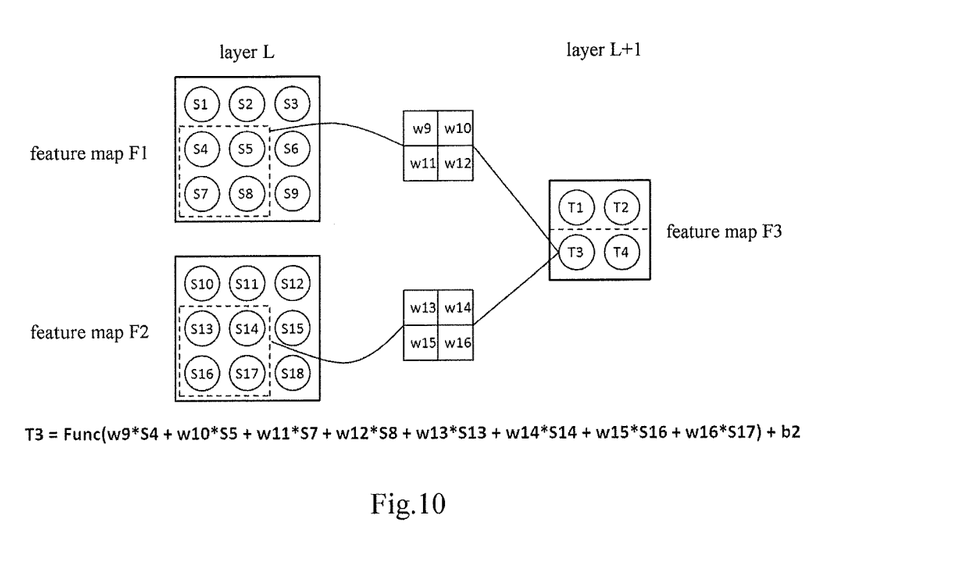

FIG. 10 illustrates the process of calculating the response value of the neuron T3 in the feature map F3 in the layer L+1 in FIG. 3 by using the convolutional-neural-network-based classifier according to the embodiments of the present invention. As shown in FIG. 10, in the convolutional-neural-network-based classifier according to the present invention, the response value of the neuron T3 in the feature map F3 is obtained by using response values (the response values are correspondingly marked as S4, S5, S7 and S8) of neurons S4, S5, S7 and S8 (i.e. the four neurons at the left lower part of the feature map F1) in the feature map F1 and response values (the response values are correspondingly marked as S13, S14, S16 and S17) of neurons S13, S14, S16 and S17 (i.e. the four neurons at the right upper part of the feature map F2) in the feature map F2 in the layer L, as well as a template comprising weights w9, w10, w11 and w12 and a template comprising w13, w14, w15 and w16. Therefore, the response value T3 is as follows:

$$T3=\text{Func}(w9*S4+w10*S5+w11*S7+w12*S8+w13*513+w14*S14+w15*S16+w16*S17)+b2 \qquad (7)$$

Figure 11:
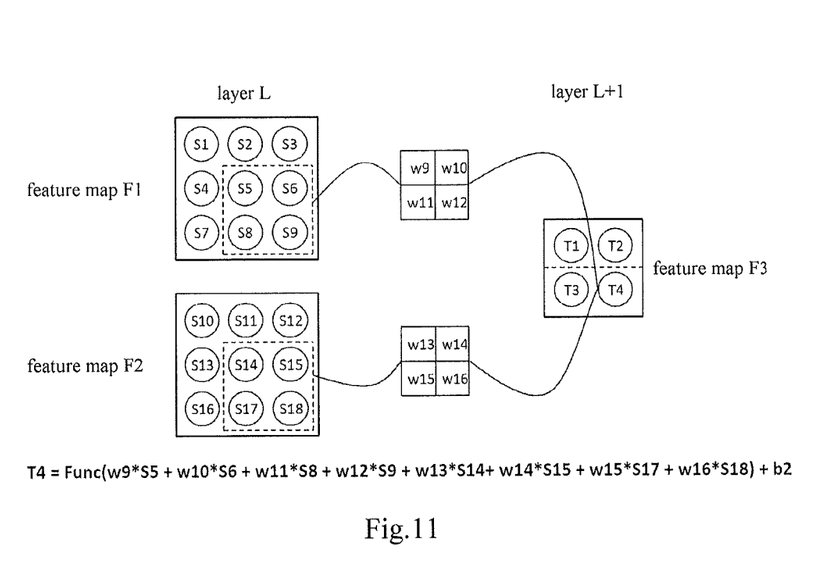

FIG. 11 illustrates the process of calculating the response value of the neuron T4 in the feature map F3 in the layer L+1 in FIG. 3 using the convolutional-neural-network-based classifier according to the embodiments of the present invention. As shown in FIG. 11, in the convolutional-neural-network-based classifier according to the embodiments of the present invention, the response value of the neuron T4 in the feature map F3 is obtained by using response values (the response values are correspondingly marked as S5, S6, S8 and S9) of neurons S5, S6, S8 and S9 (i.e. the four neurons at the right lower part of the feature map F1) in the feature map F1 and response values (the response values are correspondingly marked as S14, S15, S17 and S18) of neurons S14, S15, S17 and S18 (i.e. the four neurons at the right upper part of the feature map F2) in the feature map F2 in the layer L, as well as a template comprising weights w9, w10, w11 and w12 and a template comprising w13, w14, w15 and w16. Therefore, the response value T4 is as follows:

$$T4=\text{Func}(w9*S5+w10*S6+w11*S8+w12*S9+w13*S14+w14*S15+w15*S17+w16*S18)+b2 \qquad (8)$$

As can be seen by comparing FIGS. 8 to 11 (in particular the calculation formulae provided therein), for the less-constrained convolution operation, in calculating a response value of any neuron in the feature map F3 in the layer L+1: for the neurons T1 and T2 belonging to the same class, the feature map F1 in the layer L uses the same convolutional templates (w1, w2, w3, w4), and the feature map F2 in the layer L uses the same convolutional templates (w5, w6, w7, w8). For the neurons T3 and T4 belonging to another class, the feature map F1 in the layer L uses the convolutional templates (w9, w10, w11, w12), and the feature map F2 in the layer L uses the same convolutional templates (w13, w14, w15, w16). For the less-constrained convolution operation, in calculating response values of the respective neurons in the same feature map, neurons belonging to the same class use the same convolutional templates.

In the above embodiment, by less-constraining the convolution operation in such a way that convolution is performed using a plurality of convolutional templates between two feature maps (for example, F3 is convoluted with F1 using a plurality of templates), it is made possible that more features are extracted. According to mode recognition theory, a recognition effect of a statistical classifier depends mainly on the number and the validity of extracted features for a sample. The basic operations of feature extraction using a plurality of templates and feature extraction using a single template are consistent with each other (that is, both are convolution), and more features can be extracted by using a plurality of templates, so compared with the manner of using a single template, the method of using a plurality of templates has an advantage in terms of improving classification accuracy.

In addition, according to the embodiment of the present application, an activation function used in calculating the response values may be configured to acquire positive response values, so as to increase a convergence speed.

The nonlinear transformation function Func( ) (also referred to as an activation function) in FIGS. 8 to 11 is configured to convert a negative convolution result to a positive small value. A convolution result refers to contents in the parentheses of the function Func( ). For example, in calculating a response value of each neuron, a nonlinear truncated function is used as the nonlinear transformation function Func( ) in FIGS. 8-11, as shown in the following formula (9):

$$\text{Func}(x) = \begin{cases} \varepsilon & x \leq 0, \varepsilon \in (0, 10^{-6}) \\ x & x > 0 \end{cases} \qquad (9)$$

Where x represents a convolution result. For example, in the formula (5), x represents $$w1*S1w2*S2w3*S4w4*S5+w5*S10w6*S11w7*S13w8*S14$$

The above formula (9) means that all the values of x which are less than or equal to 0 are truncated to a small quantity E which is slightly greater than 0, while the values of x which are originally greater than 0 are kept invariable. Hereinafter, setting the small quantity to be within a range of 0 to 10-6 is only an example; actually, the small quantity may be set to be a value within other ranges according to requirements.

In another embodiment of the present invention, as the nonlinear transformation function Func( ) in FIGS. 8 to 11, a nonlinear truncated function configured to take an absolute value for a negative convolution result may be used, as shown in the following formula (10):

$$\text{Func}(x)=|x| \tag{10}$$

As would be readily understood, the above formulae (9) and (10) are only examples; and other nonlinear transformation functions may be used according to requirements, as long as the functions are configured to acquire positive response values.

By using a new activation function, i.e. an activation function configured to acquire positive response values, an increase in a convergence speed is made possible. The less-constrained convolution increases the number of the extracted features, causing a great increase in the total number of parameters of the whole convolutional neutral network, such that in a case where the total number of training samples are invariable, during network training the convergence speed will decrease, prolonging training time; using an activation function which acquires positive response values can increase the convergence speed, which is very advantageous.

Hereinafter, the dividing scheme of feature maps in the convolutional-neural-network-based classifier according to the embodiment of the present invention is described.

For the convolutional-neural-network-based classifier according to the embodiment of the present invention, in a training phase it is necessary to pre-determine a dividing scheme of feature maps. In one embodiment, for the convoultional neural network classifier as shown in FIG. 2, a dividing scheme of neurons on all the feature maps in the first less-constrained convolutional layer counted from the left is determined first, and then a dividing scheme of neurons on feature maps in remaining less-constrained convolutional layers.

A physical basis for determining a dividing schemes is described first.

The physical basis for dividing schemes may be related to specific tasks. For example, in one embodiment, dividing of a plurality of regions (each region includes a predetermined number of neurons) in a feature map is performed based on the distribution of pixels of an image. Hereinafter, taking handwritten characters recognition for example, a dividing scheme based on stroke pixel distribution is introduced; a basic idea of this solution is seeking for a dividing scheme, so as to ensure a relatively small difference in the stroke pixel distribution between divided regions. For the sake of conciseness, the dividing scheme of neurons on all the feature maps in the first less-constrained convolutional layer counted from the left is introduced only for the convolutional neural network as shown in FIG. 2, and all the feature maps may adopt the same dividing scheme.

Assuming that there exists a total of N training samples, binarization is performed for all the character samples $\text{image}_k$ (k=1, . . . , N) used for training according to conventional methods, and then they are normalized to the same size (with a height of H and a width of W). Thereafter, all the character samples are added together in a point-to-point manner, so as to obtain a stroke pixel summarizing map StrokeMap:

$$\text{StrokeMap}(i,j) = \frac{1}{N} \cdot \sum_{k=1}^{N} \text{image}_k(i,j) \tag{11}$$

$$i=1,\ldots,H \quad j=1,\ldots,W$$

Since the binarization operation is performed, on the character samples regions which are 1 represent presence of stroke pixels and regions which are 0 represent an absence of stroke pixels. A value of each pixel on the stroke pixel summarizing map StrokeMap is an average value of numbers of times of all the training images having stroke pixels at the pixel position.

All the pixels on the stroke pixel summarizing map StrokeMap are traversed, with the following operations being performed:

(1) A current point (i, j) is determined on the stroke pixel summarizing map StrokeMap.

(2) The stroke pixel summarizing map StrokeMap is divided into a predetermined number of regions, e.g. four regions, by means of a horizontal line and a vertical line of this point, and a sum of average values of numbers of times of stroke pixels in each of the regions (i.e. a sum of all the pixel values) is calculated.

(3) Each two of the four regions are divided as one group, and a total of six groups ($C_4^2=6$) may be divided. A difference in a sum of average values of numbers of times of stroke pixels in two regions in each group is calculated. A sum of differences of the six groups is calculated and recorded.

A point with a minimum value of the sum of the differences of the six groups as recorded is sought for in the stroke pixel summarizing map StrokeMap. The stroke pixel summarizing map StrokeMap is divided into four regions by means of a horizontal line and a vertical line of this point, and this dividing scheme is used as a dividing scheme of neurons on a feature map, that is, all the neurons on the feature map also correspond to four classes, with each class of neurons using the same convolutional templates.

In the above embodiment, the dividing of the plurality of regions of the feature map is performed based on a pixel distribution of the image, and specifically, is performed based on a quantity distribution of foreground pixels of a binary image of an image. As would be readily understood, however, the dividing of the plurality of regions may also be performed based on a density distribution of foreground pixels of a binary image of the image. For example, each region as divided may be made to have the same density.

In addition, in one embodiment, dividing of a plurality of regions may be performed based on the structure of an image. Still taking a character image for example, for example an image to be divided is a handwritten character "化". The character "化" is of a left-right structure, and thus can be divided into left and right regions according to radicals, i.e. an image region containing "亻" and an image region containing "匕". For example, an image to be divided is a handwritten character "6", the character "6" may be divided into upper and lower parts, i.e. an image region generally containing "o" and an image region generally containing the upper circular arc part. It should be noted that: each person has a different handwriting habit, so during actual dividing, a proportion of an image to be divided is not fixed, but floats on the basis of a predetermined proportion.

Although performing the dividing of the regions based on the structure of an image or a binary image of an image is described herein by taking a handwritten character for example, it would be readily understood that the targeted image is not limited to a handwritten character but may be any other proper images, such as an image of a splintering cell, a map image and so on.

The foregoing describes the physical basis for determining dividing schemes. Next, dividing schemes will be described according to whether dividing schemes between a plurality of less-constrained convolutional layers and between a plurality of feature maps are the same as each other. There exist dividing schemes of two levels, a first one of which is whether all the feature maps to which each sample corresponds use the same dividing scheme, and a second one of which is whether the same dividing scheme is used between samples. As far as this is concerned, the following four dividing schemes may be used for all feature maps in one convolutional-neural-network-based classifier:

(1) All the samples use the same dividing scheme, wherein all the feature maps to which each sample corresponds use the same dividing scheme. Herein, "all the feature maps" refer to all the feature maps on a less-constrained convolutional layer.

(2) All the samples use the same dividing scheme, wherein all the feature maps to which each sample corresponds use different dividing schemes. Herein, "all the feature maps" refer to all the feature maps on a less-constrained convolutional layer. The case where all the feature maps use different dividing schemes mainly covers the following two cases: (a) all the feature maps on each layer use the same dividing scheme, but dividing schemes used between layers are different; and (b) different dividing schemes are used between all the feature maps on each layer.

(3) All the samples use different dividing schemes, wherein all the feature maps to which each sample corresponds use the same dividing scheme. Herein, "all the feature maps" refer to all the feature maps on a less-constrained convolutional layer.

(4) All the samples use different dividing schemes, wherein all the feature maps to which each sample corresponds use different dividing schemes. Herein, "all the feature maps" refer to all the feature maps on a less-constrained convolutional layer. The case where all the feature maps use different dividing schemes mainly covers the following two cases: (a) all the feature maps on each layer use the same dividing scheme, but dividing schemes used between layers are different; and (b) different dividing schemes are used between all the feature maps on each layer.

Figure 12:
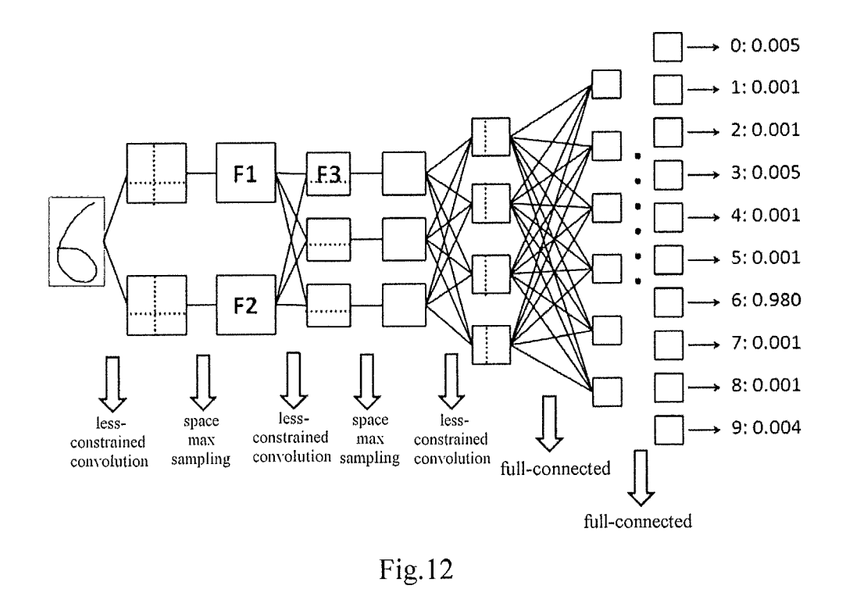
FIG. 12 is a schematic view illustrating a dividing scheme of feature maps in the convolutional-neural-network-based classifier according to the embodiment of the present invention.

Hereinafter, one embodiment of the above scheme (4) of dividing will be described by way of an example. FIG. 12 illustrates a process of applying three kinds of dividing schemes (red lines in FIG. 12) of an input sample "6" to three less-constrained convolutional layers respectively. All the samples use different dividing schemes, and all the feature maps on each layer use the same dividing scheme, but dividing schemes used between layers are different.

The foregoing describes dividing schemes according to whether dividing schemes between a plurality of less-constrained convolutional layers and between a plurality of feature maps are the same. Hereinafter, dividing schemes will be described according to whether dividing schemes for a plurality of different samples are fixed.

In one embodiment, an image serving as a sample may be divided into a plurality of image regions according to a fixed scheme, and the plurality of image regions obtained by the dividing correspond to a plurality of regions of a feature map on a less-constrained convolutional layer respectively. Herein, for example, a fixed scheme may be determined based on general features of training samples. In other words, a fixed solution is determined based on general features of training samples, and then each training sample is divided according to the fixed scheme. A specific fixed scheme may be any one of the above schemes.

In another embodiment, the convolutional-neural-network-based classifier further comprises a image dividing unit (not shown), which may divide an image serving as a sample into a plurality of image regions, and the plurality of image regions obtained by the dividing correspond to a plurality of regions on a less-constrained convolutional layer respectively. Herein, a dynamic solution may be determined based on personal features of training samples. In other words, since it is possible that personal features of one training sample are different from personal features of another training sample, dividing schemes for different training samples are possibly different. In this case, the image dividing unit may discriminately divide the image serving as the sample into a plurality of image regions based on the personal features of the training samples. A specific dividing scheme may also be any one of the above solutions.

Hereinafter, a method 1300 for training the convolutional-neural-network-based classifier according to the embodiment of the present invention will be described with reference to FIG. 13.

Figure 13:
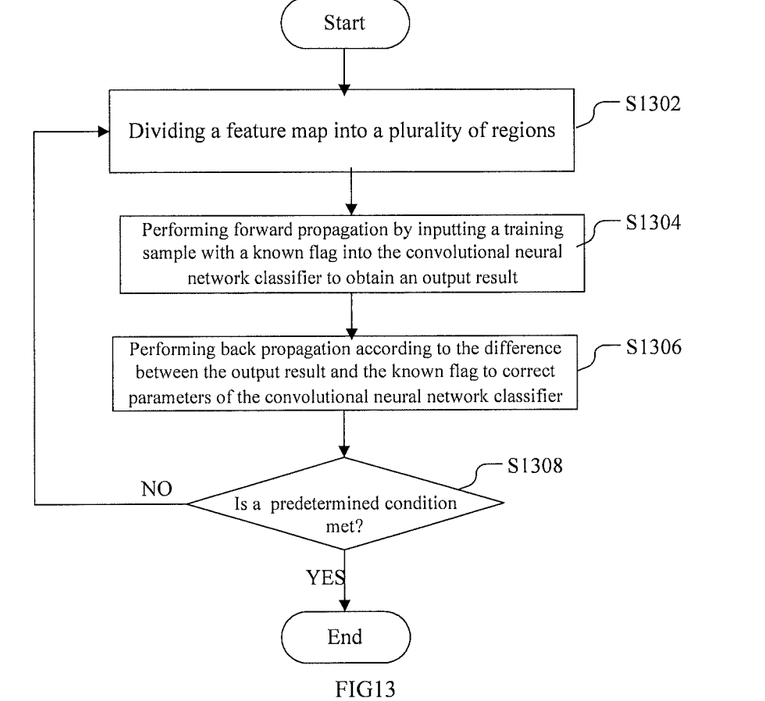
FIG. 13 is a flowchart illustrating a method for training a convolutional-neural-network-based classifier according to an embodiment of the present invention.

As shown in FIG. 13, in Step S1302, at least one feature map in the at least one of the plurality of feature map layers included in the convolutional-neural-network-based classifier is divided into a plurality of regions.

For example, at least one feature map in the at least one layer may be divided into a plurality of regions by using one of the above dividing schemes.

In addition, the layout of the convolutional-neural-network-based classifier according to the embodiment of the present invention is given; for example, the layout comprises the number of network layers, operations (less-constrained convolution, space max sampling, full-connection) on each layer, the number of feature maps and the size of feature maps on each layer, wherein the number of feature maps on an output layer is consistent with the class number of specific tasks. For example, for a digit recognition task, the number of feature maps of an output layer is 10, while for an English capital recognition task, the number of feature maps of an output layer is 26.

In Step S1304, forward propagation is performed by putting a training sample with a known flag into the convolutional-neural-network-based classifier to obtain an output result, during the forward propagation, and each of the convolutional templates, which correspond to the plurality of regions respectively, is used for obtaining a response value of a neuron in the corresponding region. Preferably, the response value may be calculated by using an activation function configured to acquire a positive response value. For example, the activation function may be an activation function configured to take an absolute value for a negative convolutional result or to convert a negative convolutional result to a positive small value.

For example, for weights of all the templates in the network, random initialization may be performed by using 0-1 distribution. Then, all the training samples are sequentially fed into the convolutional-neural-network-based classifier according to the embodiment of the present invention to perform training. For each of the training samples, an output result is obtained according to the forward propagation, i.e. a value of an output layer.

In Step S1306, back propagation is performed according to the difference between the output result and the known flag to correct parameters of the convolutional-neural-network-based classifier comprising the weights in the convolutional template. In other words, the parameters of the convolutional-neural-network-based classifier not only comprise the weights in the convolutional template but also comprise other parameters.

In Step S1308, it is judged whether a predetermined condition is met. For example, it is judged whether an error rate of the convolutional-neural-network-based classifier according to the embodiment of the present invention on a training set reaches or is lower than a predetermined value. However, it would be readily understood that the predetermined condition may also be other conditions, such as a predetermined time number or other convergence conditions and so on.

If the predetermined condition is met in Step S1308, processing ends; otherwise, return to Step S1302.

Hereinafter, a classifying method 1400 performed by a convolutional-neural-network-based classifier according to the embodiment of the present invention will be described with reference to FIG. 14.

Figure 14:
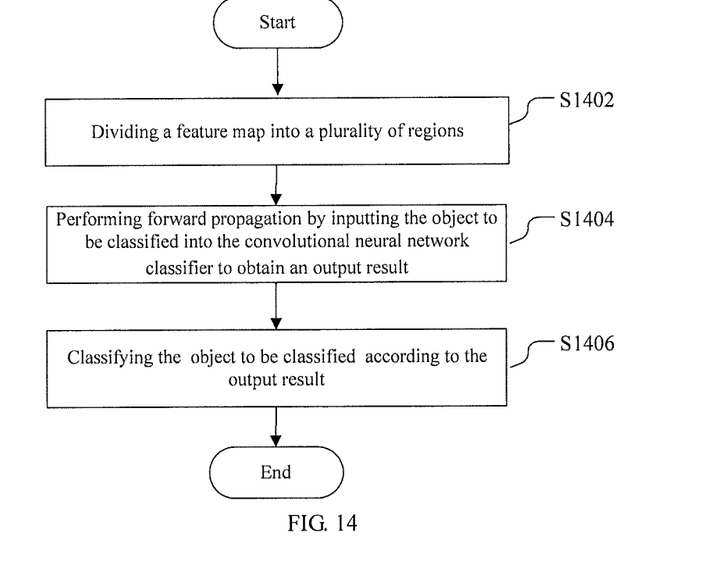
FIG. 14 is a flowchart illustrating a classifying method performed by a convolutional-neural-network-based classifier according to an embodiment of the present invention.

As shown in FIG. 14, in Step S1402, at least one feature map in the at least one of the plurality of feature map layers included in the convolutional-neural-network-based classifier is divided into a plurality of regions. Herein, the feature maps are divided by using the same dividing manner as that used during training.

In Step S1404, forward propagation is performed by putting the an object to be classified into the convolutional-neural-network-based classifier to obtain an output result, and during the forward propagation, each of the convolutional templates, which correspond to the plurality of regions respectively, is used for obtaining a response value of a neuron in the corresponding region. Preferably, the response value may be calculated by using an activation function configured to acquire a positive response value. For example, the activation function may be an activation function configured to take an absolute value for a negative convolutional result or to convert a negative convolutional result to a positive small value.

According to the embodiment of the present invention, by improving a convolution operation as a less-constrained convolution operation, it is made possible to improve the flexibility of the neural network classifier, thereby achieving the object of extracting more features to thereby further improve recognition accuracy. In addition, by improving the existing activation functions as activation functions configured to acquire a positive response value, it is made possible to increase a convergence speed.

The foregoing combined with specific embodiments describes the basic principle of the present invention. However, it should be noted that: those ordinarily skilled in the art would appreciate that all or any step or component of the method and the apparatus of the present invention may be realized, in the form of hardware, firmware, software or combinations thereof, in any calculation means (including a processor, a storage medium, etc.) or a network of calculation means. This can be realized by those ordinarily skilled in the art by applying their basic programming skills after reviewing the descriptions of the present invention.

Therefore, the object of the present invention may also be achieved by running a program or a set of programs on any calculation means. The calculation means may be well-known versatile means. Therefore, the object of the present application may also be achieved by only providing a program product containing a program code for carrying out a method or means. That is, such a program product also constitutes the present invention, and a storage medium storing such a program product also constitutes the present invention. Obviously, the storage medium may be any well-known storage medium or any storage medium that would be developed in the future.

Figure 15:
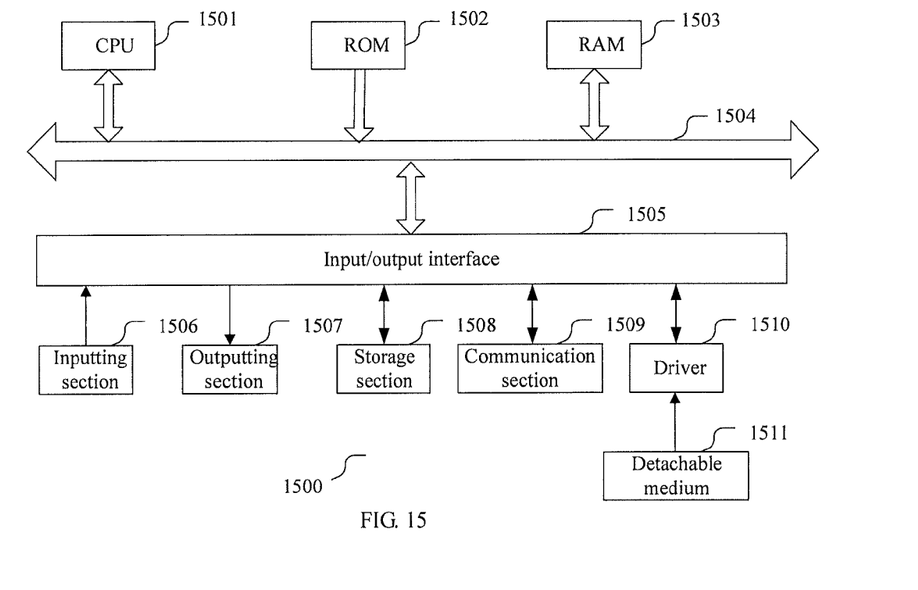
FIG. 15 is an exemplary structural view of a computing device that can be used for carrying out the classifying method performed by a convolutional-neural-network-based classifier and the method for training the convolutional-neural-network-based classifier according to the present disclosure.

In carrying out the embodiment of the present invention by means of software and/or firmware, a program constituting the software is installed from the storage medium or network to a computer having a dedicated hardware structure, e.g. the versatile computer 1500 as shown in FIG. 15, and the computer can perform various functions and so on when it is installed with various programs.

In FIG. 15, a central processing unit (CPU) 1501 performs various processing according to a program stored in a Read Only Memory (ROM) 1502 or a program loaded from a storage section 1508 to a Random Access Memory (RAM) 1503. In the RAM 1503, data needed in performing various processing by the CPU 1501 and so on is also stored according to requirements. The CPU 1501, the ROM 1502 and the RAM 1503 are linked to each other via a bus 1504. An input/output interface 1505 is also linked to the bus 1504.

The following components are linked to the input/output interface 1505: an inputting section 1506 (including a keyboard, a mouse, etc.), an outputting section 1507 (including a display, such as a Cathode-Ray Tube (CRT), a Liquid Crystal Display (LCD) and so on, a loudspeaker, etc.), a storage section 1508 (including a hard disk, etc.), and a communication section 1509 (including a network interface card such as an LAN card, a modem and so on). The communication section 1509 performs communication process via network such as Internet. The communication section 1509 may also be linked to the input/output interface 1505 as needed. A detachable medium 1511 such as a magnetic disk, an optical disk, a magneto optical disk, a semiconductor memory and so on is installed on a driver 1511 according to requirements, such that a computer program read therefrom is installed into the storage section 1508 according to requirements.

In carrying out the above series of processing by means of software, a program constituting software is installed from a network such as Internet or a storage medium such as the detachable medium 1511.

As would be understood by those skilled in the art, this storage medium is not limited to the detachable medium 1511 as shown in FIG. 15 which stores therein with a program and which is distributed separately from devices to provide a program for a user. Examples of the detachable medium 1511 include a magnetic disk (including a floppy disk (registered trademark)), an optical disk (including a Compact Disk Read-Only Memory (CD-ROM) and a Digital Versatile Disk (DVD), a magneto optical disk (including a minidisk (MD) (a registered trademark)) and a semiconductor memory. Or, the storage medium may be the ROM 1502, a hard disk included in the storage section 1508, etc., which store a program, and which are distributed together with a device including them to the user.

The present invention further proposes a program product storing a machine-readable instruction code. When the instruction code is read and executed by a machine, the above method according to the embodiment of the present invention can be carried out.

Correspondingly, a storage medium for carrying the program product storing a machine-readable instruction code is also included by the disclosure of the present invention. The storage medium includes but is not limited to a floppy disk, an optical disk, a magneto optical disk, a memory card, a memory stick, etc.

As would be readily understood by those ordinarily skilled in the art, the examples listed herein are only exemplary, and the present invention is not limited thereto.

In the Description, expressions such "first", "second" and "Nth" are used for distinguishing the described features in terms of wording, so as to clearly describe the present invention. Therefore, these expressions shall not be regarded as being limitative at all.

As an example, the respective steps of the above method and the respective constituent modules and/or units of the above device may be embodied as software, firmware, hardware or combinations thereof, and serve as a part of a corresponding device. Specific means or manners that can be used for configuring the respective constituent modules and units in the above apparatus in the form of software, firmware, hardware or combinations thereof are well-known to those skilled in the art, which will not be repeatedly described herein.

As an example, in carrying out the embodiment of the present invention by means of software and/or firmware, a program constituting the software is installed from the storage medium or network to a computer having a dedicated hardware structure, e.g. the versatile computer 1500 as shown in FIG. 15, and the computer can perform various functions and so on when it is installed with various programs.

In the foregoing descriptions of the detailed embodiments of the present invention, features described and/or shown for one embodiment may be used in one or more other embodiments in an identical or similar manner, be combined with features in other embodiments, or substitute for features in other embodiments.

It should be emphasized that when used in this text the term "comprise/include" refers to existence of features, elements, steps of assemblies, without excluding existence or addition of one or more other features, elements, steps or assemblies.

In addition, the method according to the present invention is not limited to be carried out in the temporal order described in the Description, but may also be carried out in parallel or separately in other temporal orders. Therefore, the order of carrying out the method described in the Description fails to constitute a limitation to the technical scope of the present invention.

The present invention and the advantages thereof have been described above. However, it should be understood that various changes, substitutions or transformations may be carried out without departing from the scope of the present invention defined by the attached claims. In addition, the scope of the present invention is not limited only to the detailed embodiments of processes, devices, means, methods and steps described in the Description. From the disclosure of the present invention, those ordinarily skilled in the art would readily understand that, according to the present invention, processes, devices, means, methods or steps existing or to be developed in the future which perform a substantially the same function or obtains a substantially the same result as the corresponding embodiments herein may be used. Therefore, the attached claims aim to embrace such processes, devices, means, methods or steps within the scopes thereof.

From the above descriptions, it can be seen that the disclosure at least discloses the following technical solutions:

Technical solution 1. A convolutional-neural-network-based classifier, comprising:

a plurality of feature map layers, at least one feature map in at least one of feature maps being divided into a plurality of regions; and a plurality of convolutional templates corresponding to the plurality of regions respectively, each of the convolutional templates being used for obtaining a response value of a neuron in the corresponding region.

Technical solution 2. The convolutional-neural-network-based classifier of technical solution 1, wherein the convolutional-neural-network-based classifier is configured for classifying an image, and the image is divided into a plurality of image regions, which correspond to the plurality of regions respectively, according to a fixed scheme.

Technical solution 3. The convolutional-neural-network-based classifier of technical solution 1, wherein the convolutional-neural-network-based classifier is configured for classifying an image, and the convolutional-neural-network-based classifier further comprises a image dividing unit which is configured for dividing the image into a plurality of image regions corresponding to the plurality of regions respectively.

Technical solution 4. The convolutional-neural-network-based classifier of technical solution 3, wherein the plurality of regions is divided based on a pixel distribution of the image.

Technical solution 5. The convolutional-neural-network-based classifier of technical solution 4, wherein the plurality of regions is divided based on a quantity distribution or a density distribution of foreground pixels in a binary image of the image.

Technical solution 6. The convolutional-neural-network-based classifier of technical solution 3, wherein the plurality of regions is divided based on a structure of the image.

Technical solution 7. The convolutional-neural-network-based classifier of any one of technical solutions 1 to 6, wherein for different feature maps in the same feature map layer, or for feature maps in the different feature map layers, the different dividing schemes are used for dividing the plurality of regions.

Technical solution 8. The convolutional-neural-network-based classifier of any one of technical solutions 1 to 6, wherein an activation function used for calculating the response value is configured for obtaining a positive response value.

Technical solution 9. The convolutional-neural-network-based classifier of technical solution 8, wherein the activation function is configured to take an absolute value for a negative convolutional result or to convert a negative convolutional result to a positive small value.

Technical solution 10. A classifying method by using a convolutional-neural-network-based classifier which comprises a plurality of feature map layers, comprising:

dividing at least one feature map in at least one of the plurality of the feature map layers into a plurality of regions;

performing forward propagation by inputting an object to be classified into the convolutional-neural-network-based classifier to obtain an output result, during the forward propagation, each of the convolutional templates, which correspond to the plurality of regions respectively, is used for obtaining a response value of a neuron in the corresponding region; and classifying the object to be classified according to the output result.

Technical solution 11. The method of technical solution 10, wherein the object to be classified is an image, the step of dividing at least one feature map in at least one of the plurality of the feature map layers into a plurality of regions comprising:

dividing the image into a plurality of image regions, which correspond to the plurality of regions respectively.

Technical solution 12. The method of technical solution 11, wherein the object to be classified is an image, the step of dividing at least one feature map in the at least one of the plurality of the feature map layers into a plurality of regions comprising:

dividing the image into a plurality of image regions, which correspond to the plurality of regions respectively, according to a fixed scheme.

Technical solution 13. The method of technical solution 11, wherein the step of dividing at least one feature map in at least one of the plurality of the feature map layers into a plurality of regions comprises:

dividing the at least one feature map into the plurality of regions based on a pixel distribution of the image.

Technical solution 14. The method of technical solution 13, wherein the step of dividing at least one feature map in at least one of the plurality of the feature map layers into a plurality of regions comprises:

dividing the at least one feature map into the plurality of regions based on a quantity distribution or a density distribution of foreground pixels of a binary image of the image.

Technical solution 15. The method of technical solution 11, wherein the step of dividing at least one feature map in at least one of the plurality of the feature map layers into a plurality of regions comprises:

dividing the at least one feature map into the plurality of regions based on the structure of the image.

Technical solution 16. The method of any one of technical solutions 10 to 15, wherein the step of dividing at least one feature map in at least one of the plurality of the feature map layers into a plurality of regions comprises:

for different feature maps in the same layer of feature maps, or for feature maps in the different layers of feature maps, using different dividing schemes to dividing the plurality of regions.

Technical solution 17. The method of any one of technical solutions 10 to 15, wherein the step that each of the convolutional templates, which correspond to the plurality of regions respectively, is used for obtaining a response value of a neuron in the corresponding region comprises:

calculating the response value using an activation value configured to acquire a positive response value.

Technical solution 18. The method of technical solution 17, wherein the step that each of the convolutional templates, which correspond to the plurality of regions respectively, is used for obtaining a response value of a neuron in the corresponding region comprises:

calculating the response value using an activation value configured to take an absolute value for a negative convolutional result or to convert a negative convolutional result to a positive small value.

Technical solution 19. A method for training the convolutional-neural-network-based classifier, which comprises a plurality of feature map layers, comprising: dividing at least one feature map in at least one of the plurality of the feature map layers into a plurality of regions;

performing forward propagation by inputting a training sample with a known flag into the convolutional-neural-network-based classifier to obtain an output result, during the forward propagation, each of the convolutional templates, which correspond to the plurality of regions respectively, is used for obtaining a response value of a neuron in the corresponding region; performing back propagation according to the difference between the output result and the known flag to correct parameters of the convolutional-neural-network-based classifier comprising the weights in the convolutional template; and repeating the above steps until a predetermined condition is met.

Technical solution 20. The method according to technical solution 19, wherein the training sample is an image, the step of dividing at least one feature map in at least one of the plurality of the feature map layers into a plurality of regions comprising:

dividing the image into a plurality of images regions, which correspond to the plurality of regions respectively, according to a fixed scheme respectively, wherein the fixed scheme is determined based on general features of the training sample.

Technical solution 21. The method according to technical solution 19, wherein the training sample is an image, the step of dividing at least one feature map in at least one of the plurality of the feature map layers into a plurality of regions comprising:

dividing each image into a plurality of image regions, which correspond to the plurality of regions respectively, based on the personal features of each the image respectively. Technical solution 22. The method according to technical solution 21, wherein the step of dividing at least one feature map in at least one of the plurality of the feature map layers into a plurality of regions comprises:

dividing the at least one feature map into the plurality of regions based on a pixel distribution of the image.

Technical solution 23. The method according to technical solution 22, wherein the step of dividing at least one feature map in at least one of the plurality of the feature map layers into a plurality of regions comprises:

dividing the at least one feature map into the plurality of regions based on a quantity distribution or a density distribution of foreground pixels of a binary image of the image.

Technical solution 24. The method according to technical solution 21, wherein the step of dividing at least one feature map in at least one of the plurality of the feature map layers into a plurality of regions comprises:

dividing the at least one feature map into the plurality of regions based on the structure of the image.

Technical solution 25. The method of any one of technical solutions 19 to 25, wherein the step of dividing at least one feature map in at least one of the plurality of the feature map layers into a plurality of regions comprises:

for different feature maps in the same layer of feature maps, or for feature maps in the different layers of feature maps, using different dividing schemes for the dividing of the plurality of regions.

Technical solution 26. The method of any one of technical solutions 19 to 25, wherein the step that each of the convolutional templates, which correspond to the plurality of regions respectively, is used for obtaining a response value of a neuron in the corresponding region comprises:

calculating the response value by using an activation value configured to acquire a positive response value.

Technical solution 27. The method of technical solution 26, wherein the step that each of the convolutional templates, which correspond to the plurality of regions respectively, is used for obtaining a response value of a neuron in the corresponding region comprises:

calculating the response value by using an activation value configured to take an absolute value for a negative convolutional result or to convert a negative convolutional result to a positive small value.

The invention claimed is:

1. A method for training the convolutional-neural-network-based classifier, which comprises a plurality of feature map layers, comprising:

dividing at least one feature map in at least one of the plurality of the feature map layers into a plurality of regions;

performing forward propagation by inputting a training sample with a known flag into the convolutional-neural-network-based classifier to obtain an output result, during the forward propagation, each of the convolutional templates, which correspond to the plurality of regions respectively, is used for obtaining a response value of a neuron in the corresponding region;

performing back propagation according to the difference between the output result and the known flag to correct parameters of the convolutional-neural-network-based classifier comprising the weights in the convolutional template; and repeating the above steps until a predetermined condition is met, wherein, one of schemes of the dividing are different for different feature maps and schemes of the dividing are different for different training samples.

2. The method according to claim 1, wherein the training sample is an image, the step of dividing at least one feature map in at least one of the plurality of the feature map layers into a plurality of regions comprising:

dividing the image into a plurality of images regions, which correspond to the plurality of regions respectively, according to a fixed scheme respectively, wherein the fixed scheme is determined based on general features of the training sample.

3. The method according to claim 1, wherein the training sample is an image, the step of dividing at least one feature map in at least one of the plurality of the feature map layers into a plurality of regions comprising:

dividing each image into a plurality of image regions, which correspond to the plurality of regions respectively, based on the personal features of each the image respectively.

4. The method according to claim 3, wherein the step of dividing at least one feature map in at least one of the plurality of the feature map layers into a plurality of regions comprises:

dividing the at least one feature map into the plurality of regions based on a pixel distribution of the image.

5. The method according to claim 4, wherein the step of dividing at least one feature map in at least one of the plurality of the feature map layers into a plurality of regions comprises:

dividing the at least one feature map into the plurality of regions based on a quantity distribution or a density distribution of foreground pixels of a binary image of the image.

6. The method of claim 1, wherein the step of dividing at least one feature map in at least one of the plurality of the feature map layers into a plurality of regions comprises:

dividing the at least one feature map into the plurality of regions based on the structure of the image.

7. The method of claim 1, wherein the step that each of the convolutional templates, which correspond to the plurality of regions respectively, is used for obtaining a response value of a neuron in the corresponding region comprises:

using an activation function which is configured to acquire a positive response value, to obtain the response value of the neuron in the corresponding region.

8. The method of claim 7, wherein the activation function is configured to take an absolute value for a negative convolutional result or to convert a negative convolutional result to a positive small value.

* * * * *